United States Patent [19]
Arpe et al.

[11] 3,835,178
[45] Sept. 10, 1974

[54] PROCESS FOR THE PRODUCTION OF MIXTURES CONSISTING OF BENZYL CYANIDE AND β-PHENYLETHYLAMINE

[75] Inventors: Hans-Jürgen Arpe, Fischbach/Taunus; Ernst Ingo Leupold, Hofheim/Taunus, both of Germany

[73] Assignee: Farbwerke Hoechst Aktiengesellschaft vormals Meister Lucius & Bruning, Frankfurt/Main, Germany

[22] Filed: Oct. 20, 1972

[21] Appl. No.: 299,211

[30] Foreign Application Priority Data
Oct. 22, 1971 Germany............................ 2152646

[52] U.S. Cl........ 260/465 R, 260/464, 260/570.8 R
[51] Int. Cl.................C07c 121/02, C07c 121/52, C07c 87/28
[58] Field of Search.................. 260/465 R, 570.8 R

[56] References Cited
UNITED STATES PATENTS
3,219,702  11/1965  Van Werth et al.......... 260/570.8 X

*Primary Examiner*—Lewis Gotts
*Assistant Examiner*—Dolph H. Torrence
*Attorney, Agent, or Firm*—Curtis, Morris & Safford

[57] ABSTRACT

Process for the production of mixtures consisting of benzyl cyanide and β-phenylethylamine on the basis of cyclohexylideneacetonitrile in the presence of a two phase catalyst.

10 Claims, No Drawings

PROCESS FOR THE PRODUCTION OF MIXTURES CONSISTING OF BENZYL CYANIDE AND β-PHENYLETHYLAMINE

The present invention relates to a process for the production of mixtures consisting of benzyl cyanide and β-phenylethylamine by means of dehydrogenation or isomerization of cyclohexylidene acetonitrile. The composition of the mixtures can be varied within a wide range.

Up to now benzyl cyanide has been prepared by chlorination of toluene into benzyl chloride and by subsequent reaction with alkali metal cyanides. In this process the chlorine has either to be recovered by expensive processes (HCL-oxidation, alkali metal chloride electrolysis) from the hydrogen chloride obtained during the chlorination and from the alkali metal chloride obtained during the second stage or it is abandoned with contamination of the sewage. β-phenylethylamine has to be produced subsequently in a second reaction stage by hydrogenation of the benzyl cyanide.

The present invention provides a process for the production of mixtures consisting of benzyl cyanide and β-phenylethylamine which comprises passing the cyclohexylideneacetonitrile in the gaseous state over a two phase catalyst. The first phase of which contains metals of the platinum group and/or zinc oxide and is maintained at 200° to 600°C, whilst the second phase contains cobalt and/or nickel and is maintained at 20° to 300°C.

In the process of the invention the vapors of the cyclohexylideneacetonitrile are passed alone or diluted by an inert gas through a reactor containing the two phase catalyst. In order to produce a mixture containing mainly benzyl cyanide the secondary part of the reactor is only heated to a temperature of from 20° to 50°C. In case the portion of β-phenylethylamine is to predominate, a temperature of between 80° to 300°C, preferably 100° to 200°C, is necessary.

Concerning the β-phenylethylamine synthesis the basic reaction of the process of the invention represents an isomerization in which the hydrogen travels from the cyclohexylidine ring to the nitrile group. This isomerization consists of two steps:

1. dehydrogenation of the cyclohexylidene ring
2. hydrogenation of the cyano group by means of the hydrogen obtained during the dehydrogenation.

In case the secondary part of the reactor is maintained at a temperature of 20° to 50°C the whole reaction is interrupted before the hydrogenation takes place so that the intermediately formed benzyl cyanide can be intercepted.

Contrary to the production methods known up to now no inorganic by-products are obtained in the process of the invention so that no additional costs for recovery or waste-water purification arise. Cyclohexylideneacetonitrile is very appropriate as starting material and can be obtained from cyclohexanone and acetonitrile with a good yield.

As catalysts in the primary part of the reactor platinum metals are used such as platinum, ruthenium or rhodium, which are employed either separately or in mixtures, and/or metal oxides such as for example zinc oxide. Amongst the platinum metals platinum and rhodium are preferred. Cobalt and/or nickel are used as catalysts for the secondary part.

It is advantageous to apply the respective catalysts onto carrier substances. As carrier substances are appropriate those normally used; e.g., silicic acid, aluminum oxide, silicates, pumice and coal; but other carriers are also suitable.

Cyclohexylideneacetonitrile may be introduced into the reaction zone either alone or diluted with reaction inert gases. The degree of dilution may vary considerably. Besides nitrogen and the noble gases there may also be used for the dilution lower saturated hydrocarbons such as methane, ethane, propane, butane or other gases. It is advantageous to let the liquid cyclohexylideneacetonitrile pass from a proportioning device over a preliminary evaporator into the reaction tube which is filled with the catalyst and is heated from the outside. It is advantageous to mix the cylcohexylideneacetonitrile for example with 3 to 5 times the molar quantity of an inert gas before its entry into the reaction zone. The reaction tube consists of 2 parts which may be heated separately.

Actually, no additional hydrogen is necessary for the total transformation of cyclohexylideneacetonitrile into β-phenylethylamine. It has, however, proved to be practical to introduce, by means of a proportioning device fixed between the two reactor parts, a five to twenty fold molar excess of hydrogen in order to increase the β-phenylethylamine yield. After separation of the condensable final products the hydrogen can be recycled into the reactor.

A temperature of between 200° and 600°C, preferably between 300° and 500°C, is suitable for the primary part of the reactor whilst in the secondary part a temperature of between 20° and 50°C is appropriate for the production of a mixture mainly containing benzyl cyanide. A temperature of 80° to 300°C, preferably 100° to 200°C in the secondary part is appropriate for a mixture mainly containing β-phenylethylamine. It is advantageous to work under normal pressure, but also under a lower or slightly elevated pressure both reactions still go off satisfactorily. The residence time is preferably between 0.1 and 40 seconds, but also beyond these limits satisfactory results are still obtained.

The working up takes place in known manner. The reaction mixture is cooled after leaving the reactor and all of the condensate is distilled in order to isolate the benzyl cyanide or the β-phenylethylamine. The cyclohexylideneacetonitrile which has not been transformed is returned into the reactor.

Benzyl cyanide and β-phenylethylamine are of great importance as intermediary products, for example in the dyestuff synthesis and in the pharmaceutical chemistry.

The following examples illustrate the invention.

EXAMPLE 1

From a dropping funnel 50 m moles/h of cyclohexylideneacetonitrile are passed over a preliminary evaporator whilst 5 l/h of nitrogen are added and the mixture is metered from above into a vertically arranged glass reactor of a length of 320 mm and a diameter of 25 mm. The upper reactor half which is heated to a temperature of 450°C, is filled with 50 ml of a silicic acid catalyst containing 1.3 percent by weight of zinc oxide, whilst the lower reactor half contains, at a medium temperature of 50°C, a diatomaceous earth catalyst having 39 percent by weight of cobalt. Both catalyst portions can be heated separately from the outside.

The temperature inside the reactor is measured by means of a shiftable thermoelement.

The reaction products are condensed in a cooling trap at a temperature of −70 °C.

After a starting period of 2 hours in order to achieve constant service conditions the actual catalyst test is effected over a longer period of time. The condensate obtained after a test of 4 hours is analysed by gas-chromatography.

There are measured 12 m moles of cyclyhexylidenacetonitrile which have not been reacted and which correspond to a transformation rate of 94 percent as well as 162 m moles of benzyl cyanide corresponding to a selectivity of 86 percent. Moreover, 9 m moles of β-phenylethylamine have been formed corresponding to a selectivity of four percent. The components are separated by distillation under reduced pressure and by means of a column

EXAMPLE 2

Into the apparatus described in Example 1 there are introduced 50 m moles/h of cyclohexylideneacetonitrile whilst 3 l/h of nitrogen are added. The upper reactor half is maintained at a temperature of 390°C and is filled with 50 ml of a silicic acid catalyst containing 1.96 percent by weight of platinum, the lower reactor half contains, at a medium temperature of 130°C, a diatomaceous earth catalyst, having 58 percent of nickel. From a proportioning device fixed between the two reactor halves a hydrogen current (10 l/h) is introduced into the reactor.

After a test lasting 4 hours 21 m moles of benzyl cyanide corresponding to a selectivity of 10.5 percent are obtained and 136 m moles of β-phenylethylamine, corresponding to a selectivity of 68 percent.

EXAMPLE 3

The test is carried out as in Example 2. The first reactor half is maintained at a temperature of 400°C, and is filled with 50 ml of a silicic acid catalyst containing 1.91 percent by weight of rhodium, whilst the second reactor half contains the cobalt catalyst described in Example 1 and is maintained at a medium temperature of 150°C.

18 m moles of benzyl cyanide corresponding to a selectivity of nine percent are obtained as well as 139 m moles of β- phenylethylamine corresponding to a selectivity of 70 percent.

What is claimed is:

1. A process for the production of mixtures consisting of benzyl cyanide and β-phenylethylamine, which comprises: passing cyclohexylideneacetonitrile in the gaseous phase through a first reaction stage over a catalyst consisting essentially of (1) a metal selected from the group consisting of paladium, rhodium and ruthenium, and/or (2) zinc oxide, at a temperature between 200° and 600°C; and thereafter passing the reacting mixture through a second reaction stage over a catalyst consisting essentially of cobalt and/or nickel at a temperature between 20° and 300°C.

2. A process in accordance with claim 1 in which platinum or rhodium are used.

3. A process in accordance with claim 1 which comprises passing cyclohexylideneacetonitrile together with a three to five fold molar quantity of an inert gas over the catalyst.

4. A process in accordance with claim 1 wherein in order to increase the β-phenylethylamine yield a five to twenty fold molar excess of hydrogen is introduced to the reacting gases between the first and second stages.

5. A process in accordance with claim 1 wherein the catalyst substances are applied onto a carrier.

6. A process in accordance with claim 1 which comprises carrying out the reaction under normal pressure.

7. A process in accordance with claim 1 wherein the temperature in the first stage of reaction is between 300°and 500°C.

8. A process in accordance with claim 1, wherein the residence time is between 0.1 and 40 seconds.

9. A process in accordance with claim 1, wherein for the production of a mixture mainly containing benzyl cyanide, the temperature in the second stage of reaction is between 20° and 50°C.

10. A process in accordance with claim 1, wherein for the manufacture of a mixture mainly containing β-phenylethylamine, the temperature in the second stage of reaction is between 80° and 300°C.

* * * * *